United States Patent
Wang et al.

(10) Patent No.: US 8,187,470 B2
(45) Date of Patent: May 29, 2012

(54) ENHANCING SEDIMENTATION PERFORMANCE OF CLARIFIERS/THICKENERS

(75) Inventors: Guoxin Wang, Mulberry, FL (US); Zhengxing Gu, Mulberry, FL (US); Edward W. Gannon, Mulberry, FL (US)

(73) Assignee: ARR-MAZ Custom Chemicals, Inc., Mulberry, FL (US)

( * ) Notice: Subject to any disclaimer, the term of this patent is extended or adjusted under 35 U.S.C. 154(b) by 300 days.

(21) Appl. No.: 12/727,326

(22) Filed: Mar. 19, 2010

(65) Prior Publication Data

US 2011/0226701 A1    Sep. 22, 2011

(51) Int. Cl.
*C02F 1/52* (2006.01)
*B01D 21/01* (2006.01)

(52) U.S. Cl. ........ 210/712; 210/714; 210/726; 210/770; 210/790; 209/12.1

(58) Field of Classification Search .......... 210/702, 210/790, 770, 804, 703, 704, 705, 712, 723, 210/726, 714; 209/10, 12.1, 162, 163, 172, 209/173
See application file for complete search history.

(56) References Cited

U.S. PATENT DOCUMENTS 5,843,315 A * 12/1998 Baughn et al. ................ 210/723
6,926,465 B1 * 8/2005 Mann et al. ............... 405/128.45

* cited by examiner

*Primary Examiner* — Christopher Upton
*Assistant Examiner* — Nader Hossaini
(74) *Attorney, Agent, or Firm* — Dennis G. LaPointe

(57) ABSTRACT

Some mineral processing plants encounter difficulties in dewatering pulps using clarifier/thickener (C/T) equipment due to a layer of fine particles, air bubbles and chemicals formed at the top of the liquid in the thickener. Such layers are very stable and form a cap on the C/T. The dewatering performance of the C/T then deteriorates under these conditions, and a high percentage of solids is contained in the thickener overflow. A process for removing water from rock slurry containing a wide range of particle sizes in mineral processing operations has been developed. The process includes: (a) classifying the feed slurry into two size fractions, namely a coarse fraction and a fine fraction, (b) treating the fine fraction (and the coarse fraction if required) with a selected flocculant, and (3) thickening the flocculated slurry in sedimentation equipment to separate liquid from solids.

2 Claims, 1 Drawing Sheet

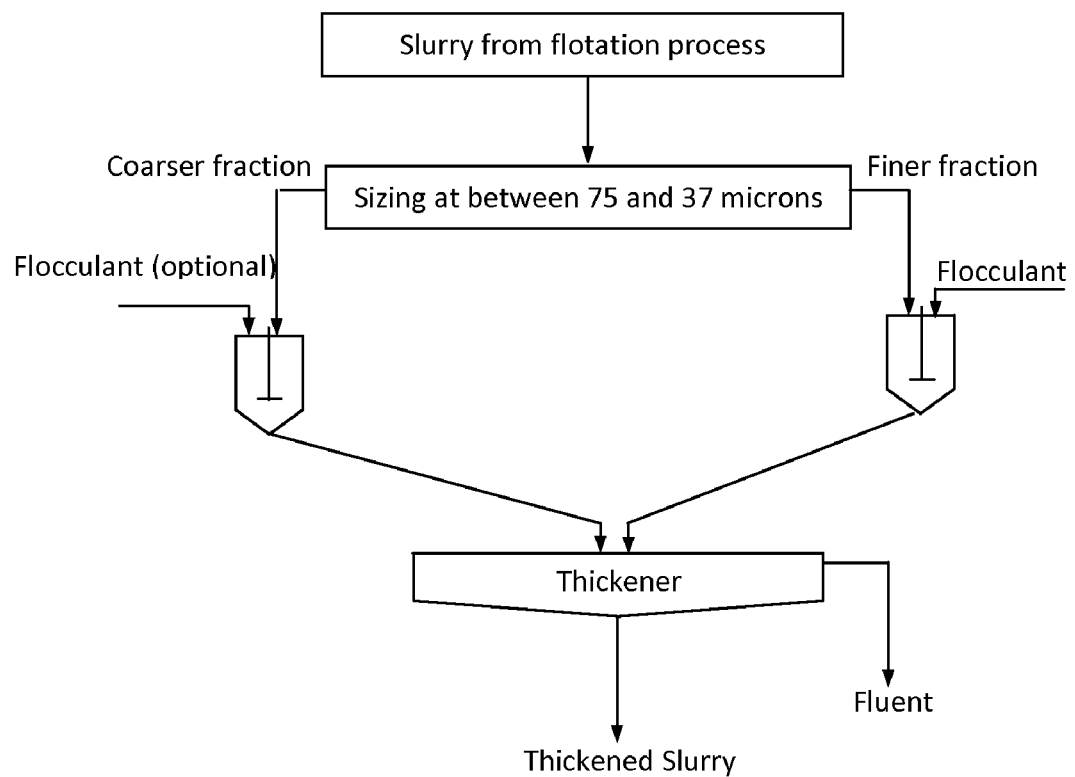

ENHANCING SEDIMENTATION PERFORMANCE OF CLARIFIERS/THICKENERS

FIELD OF THE INVENTION

The invention is related to the process for dewatering rock slurry with a wide range of particle sizes utilizing sedimentation by splitting the slurry into coarse particle and fine particle fractions, treating these fractions separately with a flocculant or multiple flocculants and then putting the fractions together again for settling to avoid the formation of the layer of particles/bubbles/chemicals on the top of the liquid during sedimentation.

BACKGROUND OF THE INVENTION

Dewatering aqueous slurries of fine mineral particles is common practice in mineral processing plant operations. Dewatering normally involves a combination of sedimentation and filtration. A majority of the water is removed by sedimentation or thickening, which produces a pulp containing 55-65% solids. Rapid settling of solid particles in a slurry produces a clarified liquid which can be decanted and recycled to the previous process. The settling rate of very fine particles can be extremely slow by gravitational acceleration alone and agglomeration with flocculant to form relatively large aggregates of fine particles, flocs, is frequently performed (for reference purposes, see B. A. Wills, "Wills' Mineral Processing Technology", 7$^{th}$ Edition, Elsevier, 2006). Filtration of the thickened pulp then generates a filter cake containing 80-90% solids.

Thickeners are commonly used to increase the solids' concentration of a suspension of concentrate or tailings. The mineral particles settle to the bottom of the thickener, and the liquid overflows the top of the thickener. It is usually desired to achieve an underflow with high solids' content and a clear overflow with minimal mineral content. In order to obtain a high solids' underflow and clear overflow, one flocculant or a mixture of different flocculants are used to flocculate fines to increase their settling velocity. The utilization of flocculants can shorten the residence time of fine particles inside the thickener and improve its unit capacity. In the mineral processing industry, some flotation plants encounter difficulties in the thickening operation because a thick fluffy layer of flocculated fine particles/air bubbles/chemicals is formed on top of liquid of the thickener. The layer floats stably on the top of the liquid. When the moisture of the layer is vaporized, a dry fluffy layer with cracks can be observed. Such a fluffy layer floating on the top of the liquid imposes an adverse effect on the dewatering performance of a thickener. It reduces the dewatering capacity of the equipment because the floating fluffy layer occupies a considerable volume of the thickener. The quality of the overflow liquid deteriorates because some fine particles fall out of the floating layer and enter the overflow, resulting in overall process deterioration if the liquid is recycled. Therefore, it is desirable to improve thickening operations by obtaining rapid settling of solids and good overflow clarity of the liquid. To solve this problem, a new dewatering process is proposed.

SUMMARY OF THE INVENTION

In the new process, the rock slurry to be dewatered is sized into two size fractions, a relatively-coarse fraction and a relatively-fine fraction. The splitting size can be between 200 and 400 mesh (75 and 37 microns). Usually, no problems are experienced in dewatering coarser size fractions. They can be dewatered in a clarifier/thickener with or without flocculation treatment. The finer size fraction is treated with a flocculant. The flocculated fine particle slurry is discharged into a separate clarifier/thickener (hereinafter referred to as "C/T") or into the same C/T with coarser size fraction slurry for sedimentation. Mixing the coarse and fine fractions can be minimized by separate pipe discharges into the C/T center-well to enhance performance. The laboratory test results show that the new dewatering process can prevent the formation of a fluffy flocculated layer on the top of the liquid in the sedimentation equipment and improve the dewatering performance.

BRIEF DESCRIPTION OF THE DRAWING

In the accompanying drawing:
FIG. 1 is a flow chart depicting the inventive enhanced sedimentation process of the present invention.

DETAILED DESCRIPTION OF THE INVENTION

FIG. 1 is a flow chart depicting the inventive enhanced sedimentation process of the present invention. It is presented as a visual description of the inventive process described hereinafter. The rock slurry with a wide range in particle size from zero to 20 mesh (0 to 850 microns) is subjected to dewatering with sedimentation equipment with addition of flocculant. The new process is proposed to improve the dewatering efficiency. Prior to the dewatering process, a classification process is added to separate the slurry into two size fractions: coarse and fine. Based on results of experimentation, the preferred anticipated splitting size can be between about 200 and 400 mesh (about 75 to 37 microns) depending on the solid particles' properties. The sized fraction is then treated separately with flocculants. The finer size fraction is treated with flocculant for rapid settling, and the coarser size fraction may or may not be treated with flocculant depending on the splitting size. The separately flocculant-treated sized fraction slurries are combined together or treated separately in the dewatering process. With the invented process, the efficiency of dewatering the slurry is greatly improved.

EXAMPLE 1

In a potash plant operation, the −20 mesh particle size fraction of ore was subjected to reverse flotation to remove the acid-insoluble minerals as impurities (tailings). The tailings were then flocculated with a flocculant and settled in a thickener in order to recycle the saturated brine to the flotation process. Sometimes, a thick layer of fluffy flocs (up to 5% the tailings) was formed on the top of thickener. Such a fluffy floc layer leads to poor performance of the thickener, resulting in poor quality of the recycled brine and in reduction of overall flotation efficiency. For example, the recovery of the potash can drop to 5%.

With this invention, tailing was split at 400 mesh (37 microns). The −400 mesh fraction was treated with a flocculant and settled. There was a sharp separation between solids and liquid brine. No floc layer was formed on the top of the brine. The −20+400 mesh fraction was settled without the addition of flocculant. The two fractions of the tailings were combined for sedimentation. No floc layer occurred during the sedimentation, and the clean brine from sedimentation was recycled back to the flotation process. The percent solids of the settled solids was increased by up to 5%. The efficiency of the dewatering process was improved, and the consumption of flocculant was reduced.

Another test on the tailing was conducted with the splitting size at 200 mesh (75 microns). Similar results were achieved.

EXAMPLE 2

In a molybdenum flotation operation, the molybdenite concentrate (about 40%-200 mesh in size) was fed to a thickener and treated with a flocculant for sedimentation, followed with filtration for final dewatering. A thin layer of molybdenite concentrate was noted to float on the liquid in the thickener. This molybdenum was lost with the discharge of the overflow liquid from the thickener. A sample of the concentrate was taken, split at 200 mesh, and treated separately with the same flocculant. The liquid above the settle solids was clear, and no fluffy float material was observed. The loss of the molybdenum from the sedimentation process was prevented. When the two fractions of the treated concentrate were combined for sedimentation, the water above the settled solids was still clear, and no fluffy float material was observed. The new process increased the percent solids of the settled solids by 1-2%. In this new process, a split of the concentrate at 200 mesh could be made with a hydrocyclone prior to thickening. The flocculant could then be added separately into the cyclone underflows and overflows before their introduction to thickening together. The loss of the molybdenum will be minimized with this new process.

Accordingly, the inventive process for dewatering fine particle rock slurry results in improvement in efficiency of sedimentation and which increases solids concentration in thickened solids, comprises the steps of:

classifying a feed slurry by splitting the feed slurry into two size fractions comprising a coarse fraction and a fine fraction at a splitting size of between about 75 and 37 microns;

treating the fine fraction with a selected flocculant; and thickening a resultant flocculated slurry of fine fraction solids in sedimentation equipment to separate liquid from solids.

Optionally, the coarse fraction may be treated with the selected flocculant or another selected flocculant, as appropriate.

The process comprises the step of combining the coarse fraction and the fine fraction after flocculant addition to the fine fraction, and then subjecting the resulting mixture to a sedimentation process or combining the coarse fraction and the fine fraction after flocculant addition to the fine fraction and the coarse fraction, and then subjecting the resulting mixture to a sedimentation process.

Classifying (sizing) the rock slurry can be done with any classification equipment, including screens, hydrocyclones, hydrosizers, and other similar equipment typically used in the industry. Dewatering, including sedimentation and filtration, can be done with any dewatering equipment, including clarifiers, thickeners, centrifuges, filters, and other similar equipment typically used in the industry.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. A process for dewatering fine particle rock slurry results in improvement in efficiency of sedimentation and increases solids concentration in thickened solids, the process comprising the steps of:

classifying a feed slurry by splitting the feed slurry into two size fractions comprising a coarse fraction and a fine fraction at a splitting size of between 75 and 37 microns;

treating the fine fraction with a selected flocculant; and optionally treating the coarse fraction with the selected flocculant or another flocculant and thickening a mixed resultant slurry of fine fraction and coarse fraction in sedimentation equipment to separate liquid from solids.

2. The process according to claim 1, further comprising the step of:

combining the coarse fraction and the fine fraction after flocculant addition to said fine fraction and said coarse fraction, and then subjecting the resulting mixture to a sedimentation process.

\* \* \* \* \*